Figure 1:
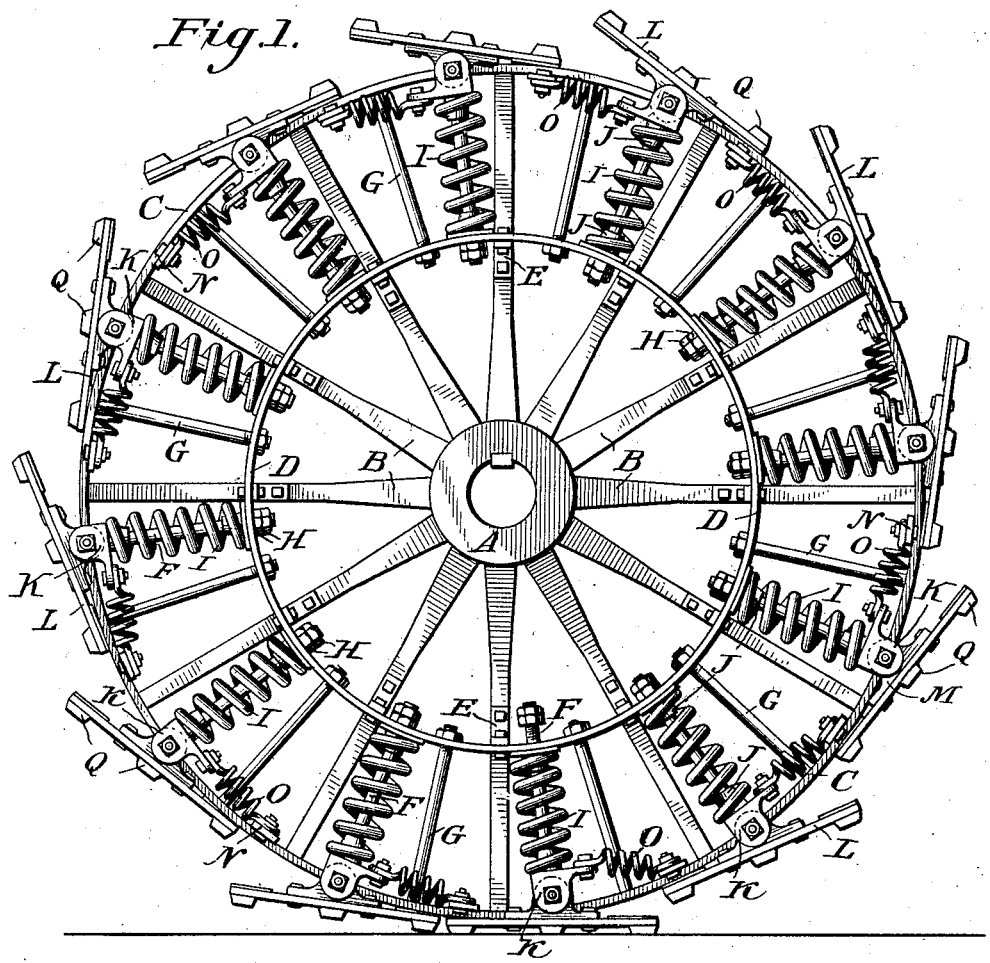

No. 788,504. PATENTED APR. 25, 1905.
C. M. GREEN.
WHEEL.
APPLICATION FILED DEC. 9, 1903.

2 SHEETS—SHEET 1.

Witnesses:
J. H. Gale
D. McKenzie

Inventor:
Charles M. Green
By D. H. Houston
Attorney.

No. 788,504. PATENTED APR. 25, 1905.
C. M. GREEN.
WHEEL.
APPLICATION FILED DEC. 9, 1903.
2 SHEETS—SHEET 2.
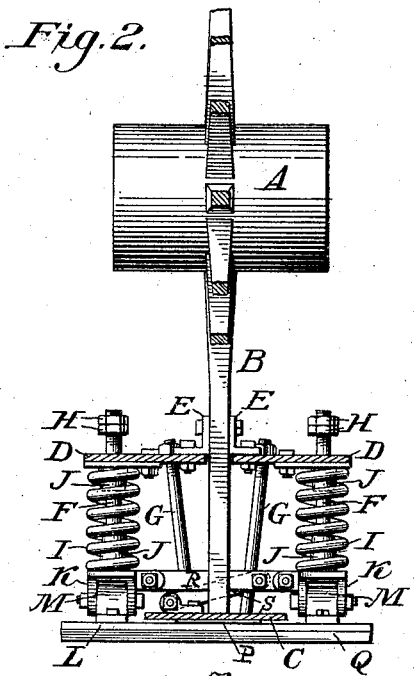
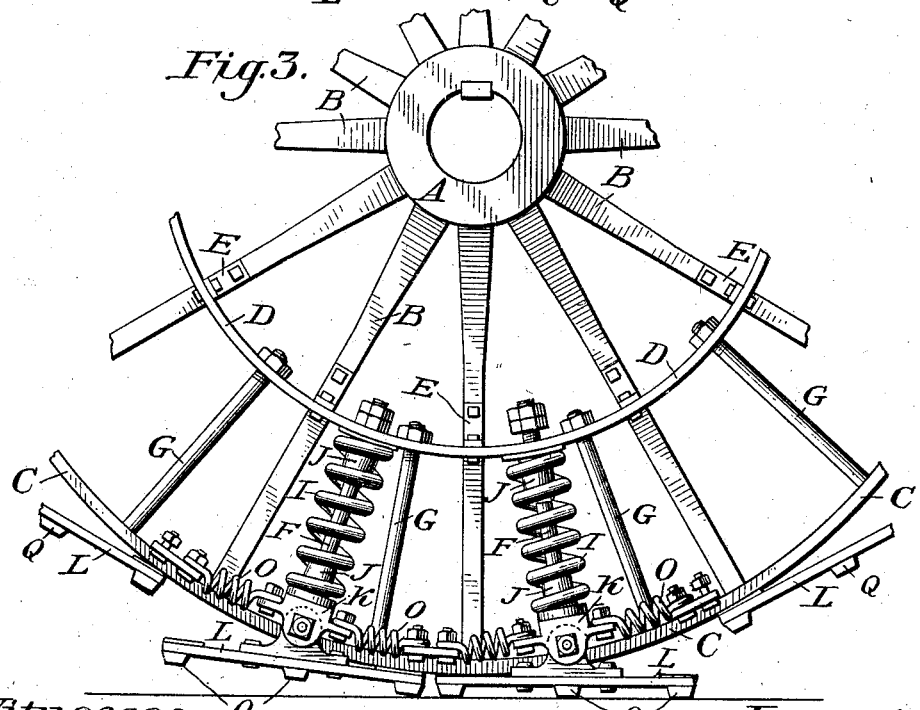

No. 788,504. Patented April 25, 1905.

UNITED STATES PATENT OFFICE.

CHARLES M. GREEN, OF WAHPETON, NORTH DAKOTA.

WHEEL.

SPECIFICATION forming part of Letters Patent No. 788,504, dated April 25, 1905.

Application filed December 9, 1903. Serial No. 184,422.

*To all whom it may concern:*

Be it known that I, CHARLES M. GREEN, a citizen of the United States, residing at Wahpeton, in the county of Richland and State of North Dakota, have invented new and useful Improvements in Wheels, of which the following is a specification.

My invention relates to wheels for engines, machines, and wagons that are constructed to travel on the surface of the ground.

The object of my invention is to provide a wheel having tread-plates connected to the wheel and which tread-plates are arranged in connection with the wheel so as to be laid by the wheel upon the surface of the ground and form a track for the wheel to roll upon.

My invention consists of the novel features of construction and combination of parts pointed out in the claims of this specification.

In the drawings similar characters of reference denote similar parts.

Figure 4:
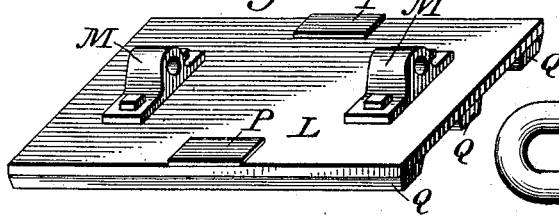
Figure 5:
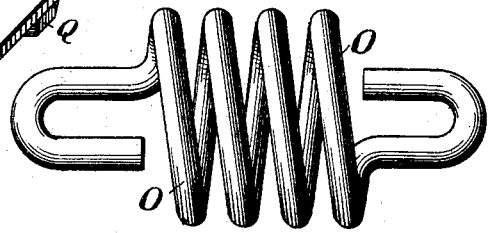

Figure 1 is a side elevation view of my wheel, showing the general arrangement of the parts. Fig. 2 is a cross-section view of a part of my wheel, showing the hub of the wheel with part of the spokes cut away and showing one of the spokes of the wheel with my invention attached. Fig. 3 is a side elevation view of a part of a modified construction of my wheel and showing two complete sections of the modified construction. Fig. 4 is a perspective view of my tread-plate and showing its general construction. Fig. 5 is an enlarged view of one of the coiled springs.

In the drawings at A is represented the hub of the wheel; at B, one of the spokes of the wheel; at C, the tire of the wheel. At D are shown two bands, which are fastened to the spokes of the wheel by bolted clips E. At F are shown the legs of the tread-plates. At G are shown bolts connecting the tire of the wheel to the bands D. At H are shown the lock-burs on the top ends of the legs of the tread-plates. At I are shown the coiled springs that support the weight of the wheel and load. At J are shown the tapered spring-holders. At K are shown the leg-joints. At L are shown the tread-plates. At M are shown the tread-plate joints. At N are shown projecting lugs connected to the tire of the wheel. At O are shown coiled springs connecting the legs with the projecting lugs on the tire of the wheel. At P are shown buffer-pads on the tread-plates. At Q are shown the tread-bars of the tread-plates. At R is shown one of the connecting-bars. At S is shown one of the jointed stay-bars.

In the construction of the invention the coiled springs are made strong enough to support the greater portion of the weight of the wheel and load, and in the operation of the invention the wheel rolls bearing partly on the coiled support-springs and rolling lightly on the tread-plates; but the major portion of the weight of the wheel and load is distributed from the bands D through the coiled springs I and legs F to the tread-plates L, which plates are connected to the legs by the tread-plate joints.

Having fully described my invention, I claim—

1. In a wheel the combination of tread-plates having joints connecting the tread-plates to legs, said legs surrounded by coiled springs, which springs are adapted to support the wheel and load, and of springs connecting the lower part of the legs to the tire of the wheel.

2. In a wheel the combination of a hub, spokes, and tire, a circular band secured on opposite sides of the spokes, legs passing through the circular bands, said legs surrounded by spiral springs, said legs having spring-holders at each end, said legs connected by joints to the tread-plates, a connecting-bar between the lower part of each pair of legs, and jointed stay-bars placed to stay the said connecting-bars to the tire of the wheel.

3. In a wheel surrounded by a series of tread-plates, means for limiting the movement of said tread-plates crosswise of the wheel, consisting of a brace having jointed attachment to the wheel and tread-plates.

4. With a wheel the combination of a series of tread-plates surrounding said wheel and connected thereto by joints and lateral springs, said springs being adapted to limit the movement of the tread-plates and provide a flexible connection between the tread-plates and the wheel.

5. In a wheel the combination of bands secured to opposite sides of the wheel, bolts connecting said bands to the tire of the wheel, legs passing through the said bands, springs connected with said legs, said springs adapted to support the wheel and load, and of tread-plates connected by joints to the lower ends of the legs.

6. With a wheel surrounded by a series of tread-plates, the combination of supporting-springs and lateral springs connecting said tread-plates to the wheel, said lateral springs being adapted to limit the movement of the tread-plates around the wheel and in connection with the supporting-springs to provide a flexible connection between the tread-plates and the wheel.

7. With a wheel the combination of a series of tread-plates surrounding said wheel, said tread-plates connected by joints to the wheel and by lateral springs, said springs being adapted to limit the movement of the tread-plates around the wheel and provide a flexible connection between the tread-plates and wheel.

8. In a wheel the combination of peripheral tread-plates connected by joints to the legs, said tread-plates adapted to tread upon the surface of the ground, said legs placed around the wheel and converging from the central portion of the wheel to the peripheral tread-plates, and said legs provided with springs adapted to support the weight of the wheel and load.

In testimony whereof I have signed my name to this specification in the presence of two subscribing witnesses.

CHARLES M. GREEN.

Witnesses:
J. H. GALE,
D. W. KENZIE.